(12) United States Patent
Larson

(10) Patent No.: US 7,481,169 B2
(45) Date of Patent: Jan. 27, 2009

(54) LEVELER

(76) Inventor: Fritz Larson, 2312 N. Riverside, McHenry, IL (US) 60050

(*) Notice: Subject to any disclaimer, the term of this patent is extended or adjusted under 35 U.S.C. 154(b) by 509 days.

(21) Appl. No.: 11/171,704

(22) Filed: Jun. 30, 2005

(65) Prior Publication Data

US 2006/0038435 A1    Feb. 23, 2006

Related U.S. Application Data

(60) Provisional application No. 60/603,391, filed on Aug. 20, 2004.

(51) Int. Cl.
*A47B 23/00* (2006.01)

(52) U.S. Cl. .................. 108/44; 224/275; 206/563; 248/346.05

(58) Field of Classification Search ............ 248/346.01, 248/371, 393, 188.2, 188.6; 108/25, 42, 108/44; 206/217, 557, 562, 564; 224/275, 224/276; 297/463.1, 256.16, 250.1, 113
See application file for complete search history.

(56) References Cited

U.S. PATENT DOCUMENTS

| | | | | |
|---|---|---|---|---|
| 2,875,940 A * | 3/1959 | Dunn | .................... | 206/562 |
| 3,318,456 A * | 5/1967 | Lipe | ........................ | 211/72 |
| 3,326,446 A * | 6/1967 | Goings | .................. | 206/563 |
| 3,499,595 A * | 3/1970 | Brooks | .................. | 206/563 |
| 3,804,031 A * | 4/1974 | Pitts | ........................ | 108/44 |
| 5,611,287 A * | 3/1997 | Begley | .................. | 108/44 |
| 6,457,421 B1 * | 10/2002 | Apichom | ................ | 108/44 |
| 2004/0107878 A1 * | 6/2004 | Podd et al. | ................ | 108/25 |

* cited by examiner

*Primary Examiner*—Gwendolyn Baxter
(74) *Attorney, Agent, or Firm*—Pauley Petersen & Erickson

(57) ABSTRACT

An apparatus for leveling an object with respect to a support surface. The apparatus includes a top portion that defines a planar surface. The top portion transitions into or is connected with a base. The base is foldable with respect to the top portion, and a free end portion of the base is removably securable to the top portion at one of a plurality of positions to adjust a height of the base and maintain the planar surface level with respect to the support surface.

20 Claims, 6 Drawing Sheets

LEVELER

CROSS REFERENCE TO RELATED APPLICATIONS

This application claims the benefit of U.S. Provisional Application No. 60/603,303, filed 20 Aug. 2004.

BACKGROUND OF THE INVENTION

1. Field of the Invention

This invention relates generally to an apparatus or device for maintaining an object level with respect to an inclined or angled support surface.

2. Description of Related Art

Many people, for example delivery drivers, place food products, such as pizzas, sandwiches and beverages, on a vehicle seat when they are driving. Typical vehicle seats have an inclination angle that results in shifting and/or movement of the container with respect to the seat surface and/or shifting and/or movement of the food product within its container, when the product containers are placed on the vehicle seat.

Thus, there is a need and desire for an apparatus or device that maintains the food product level with respect to the angled vehicle seat or similar support surface to prevent the food product from shifting and/or moving within its container.

SUMMARY OF THE INVENTION

It is one object of this invention to provide an apparatus or device for maintaining an object level with respect to an angled support surface.

It is another object of this invention to provide an apparatus or device including a planar surface for supporting the object in a level position with respect to the angled support surface.

It is another object of this invention to provide an apparatus or device for leveling an object with respect to an angled vehicle seat surface that is constructed of an inexpensive yet strong and lightweight material that can withstand a variety of conditions and still maintain a fixed position on the vehicle seat.

It is yet another object of this invention to provide an apparatus or device that is adjustable to a corresponding vehicle seat inclination angle for use with a variety of vehicle seats.

The above and other objects of the invention can be attained with an apparatus or device for leveling an object with respect to a support surface. The apparatus includes a top portion defining a planar surface. The top portion preferably transitions into a base that is foldable or bendable with respect to the top portion. At least a free end portion of the base is removably securable to the top portion at a plurality of positions to adjust a height of the base. By adjusting the height of the base, the planar surface can be maintained at a level position with respect to any angled support surface. The base is preferably movable between a flat position, wherein the base is generally parallel with and contacts at least a portion of a bottom surface of the top portion, and a folded position, wherein the base is folded with respect to the top portion and removably secured to the top portion at a selected position.

In one preferred embodiment of this invention, at least one tab is formed at a free end portion of the base. The tab is connectable or attachable with respect to the top portion to removably secure the base at a height corresponding to an inclination angle of the support surface. The tab can be removably secured to the top surface using any suitable connection known to those skilled in the art, such as an adhesive connection and/or a mechanical connection. For example, a plurality of parallel slots may be formed in the top portion. Corresponding parallel tabs formed at the free end portion of the base may interfere with and/or be positioned within the corresponding parallel slots to secure the base at a height corresponding to the inclination angle of the support surface.

In one preferred embodiment of this invention, the top portion defines a planar surface and includes a wall that extends about at least a portion of a periphery of the planar surface. Preferably, but not necessarily, the wall completely surrounds the planar surface to contain an object within or on the planar surface. The planar surface may include compartments formed by at least one support wall that extends between a first wall portion and a second wall portion. Further, the top portion may form or include at least one void or indentation, such as a recessed storage void, for accepting and containing an object, such as a beverage container. At least one recessed storage void may be formed within the planar surface, within one or more of the compartments and/or within an area of the top portion outside the defined planar surface.

In one preferred embodiment of this invention, the apparatus includes a top portion defining a planar surface and having a wall extending about a periphery of the planar surface. A cover is hingedly or pivotally attached to a portion of the wall, and movable between a closed position, covering the planar surface, and an open position. The base is connected to the top portion, and movable between a flat position, contacting at least a portion of a bottom surface of the top portion, and a folded position, wherein the base is folded with respect to the top portion and adjustably securable to the top portion. Thus, the apparatus may include an integrated "box" within which an object, such as a hot pizza, may be placed. Alternatively, the apparatus may be fixed to a box prior to use or pre-integrated with the box as a feature of the box.

Other objects and advantages of this invention are apparent to those skilled in the art, in view of the following detailed description taken in conjunction with the appended claims and drawings.

DETAILED DESCRIPTION OF THE INVENTION

The present invention provides an apparatus or device for leveling an object, such as a pizza, a sandwich, a cup of coffee and/or other objects that preferably remain in a generally level and/or upright position with respect to a support surface, such as a vehicle seat. The apparatus may be constructed or made of any suitable material or combination of materials, such as a plastic, a cloth, a paper, a cardboard, corrugated cardboard material, co-polymer polypropylene plastic, a composite of one or more of the preceding materials and/or any other suitable material known to those have ordinary skill in the art. Corrugated cardboard material and/or the co-polymer polypropylene plastic are often preferred because of beneficial strength properties and low relative cost. However, the apparatus may be constructed or made of any suitably inexpensive yet strong and lightweight material that can withstand a variety of conditions and still maintain a fixed position on the support surface. In one preferred embodiment of this invention, the apparatus is formed or constructed of a plastic frame having a thickness of about 1/32" to about 1/8" with different weight capabilities dependent upon such thickness.

Figure 1:
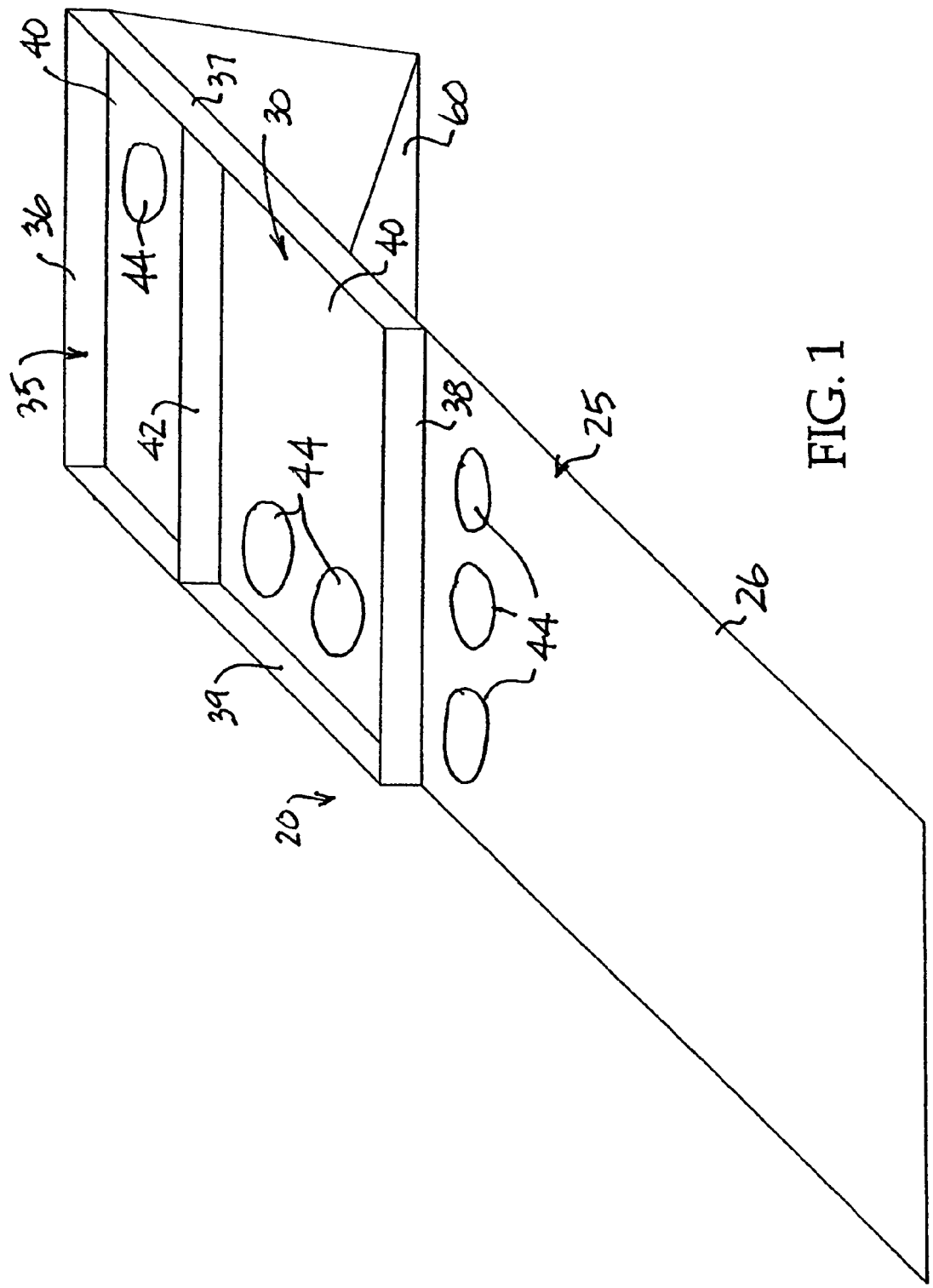
FIG. 1 is a perspective view of an apparatus or device for maintaining an object in a level position, according to one preferred embodiment of this invention.
Figure 8:
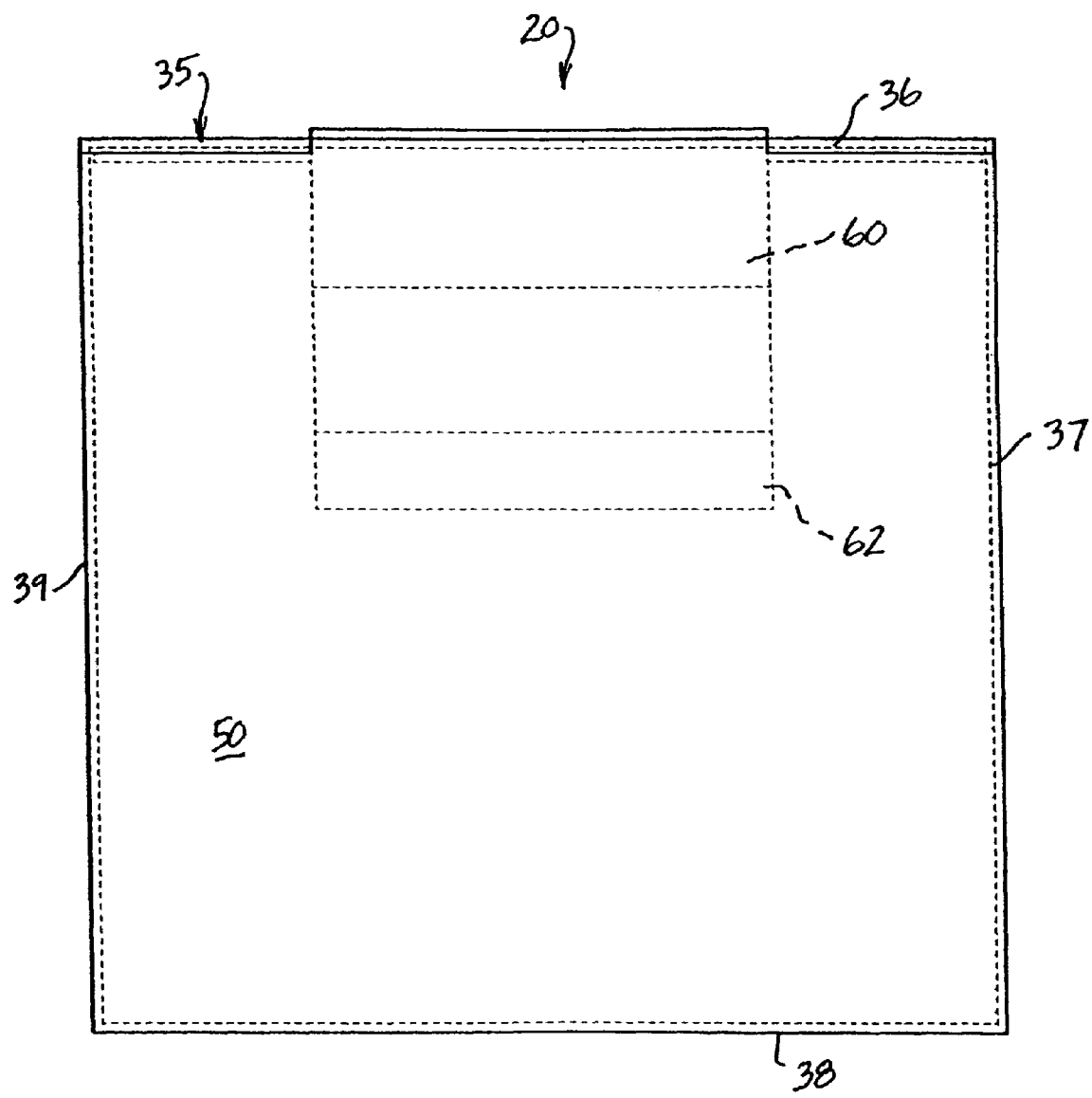
FIG. 8 is a top view of an apparatus or device for maintaining an object in a level position, according to one preferred embodiment of this invention.
Figure 9:
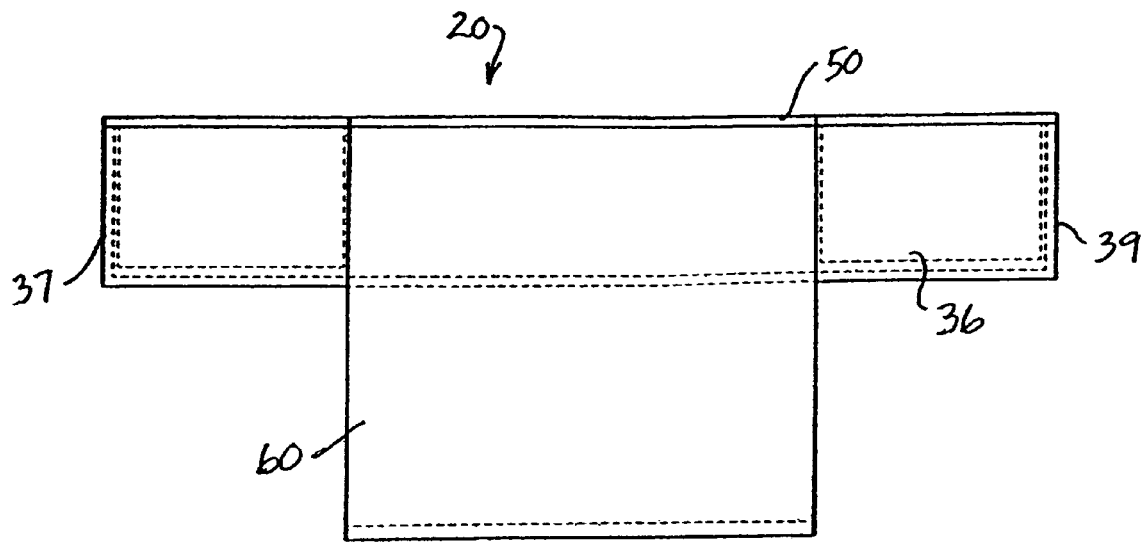
FIG. 9 is a front view of the apparatus shown in FIG. 8.
Figure 10:
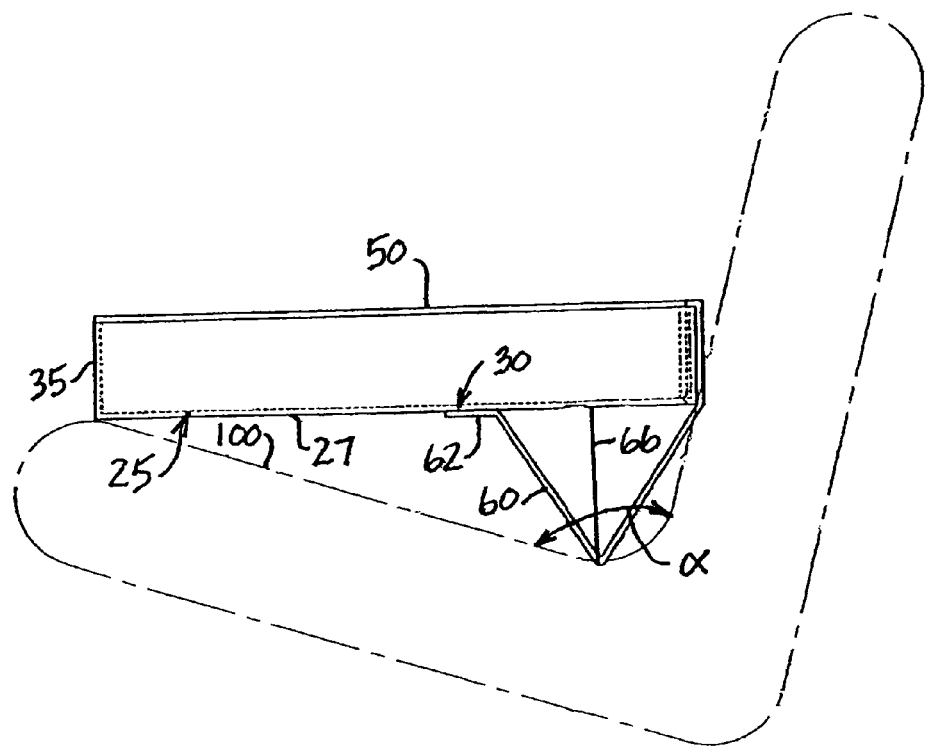
FIG. 10 is a side view of the apparatus shown in FIG. 8 positioned on a vehicle seat.

Referring to FIGS. 1-10, an apparatus or device 20 for leveling an object with respect to a support surface 100, such as a vehicle seat, includes a top portion 25. Top portion 25 has a generally flat top surface 26 and an opposing bottom surface 27, as shown in FIGS. 1 and 10, respectively. Top portion 25 can have any suitable shape and/or dimensions. For example, top portion 25 can have a general rectangular shape, as shown in FIG. 1, or a general square shape, as shown in FIG. 8. Top portion 25 defines or includes a planar surface 30 suitable for supporting and/or holding at least one object, such as a pizza, a sandwich and/or a drink container.

In one preferred embodiment of this invention, as shown in FIGS. 1 and 8-10, top portion 25 includes a wall 35 that extends about at least a portion of a periphery of planar surface 30. Preferably, wall 35 includes wall portions 36, 37, 38 and 39 that surround at least a portion of planar surface 30 to contain an object or product within a desired area of planar surface 30. For example, planar surface 30 may include a plurality of compartments 40 formed by at least one support wall 42 that extends between a first side wall or wall portion 37, and an opposing second side wall or wall portion 39. It should be apparent to those skilled in the art and guided by the teachings herein provided, that any desirable number of compartments 40 can be formed on planar surface 30 using one or more support walls 42. Support walls 42 are preferably, but not necessarily, formed or integrated with top portion 25 and/or wall 35.

As shown in FIG. 1, in one preferred embodiment of this invention, a portion of top portion 25 forms or includes at least one void or indentation, such as a recessed storage void 44 for accepting and securing or holding a container, such as a beverage cup or bottle. Top portion 25 may form or include any suitable number of recessed storage voids 44 within one or more compartments 40 and/or outside planar surface 30 defined within wall 35. Preferably, each recessed storage void 44 is initially generally coplanar with planar surface 30 and formed within top portion 25 using at least one suitable line of separation, such as a perforated line of separation and/or weakened line. Pressure can be applied to top portion 25 at the lines of separation to form recessed storage void 44, as desired, to hold or contain an object. Further, when not in use, each recessed storage void 44 can be moved to the initial position and generally coplanar with planar surface 30, if desired.

Referring further to FIGS. 8-10, in one preferred embodiment of this invention, apparatus 20 includes a cover 50 attached or connected to a portion of wall 35. Cover 50 can be attached or connected using any suitable attachment or connection component known to those skilled in the art, which allows cover 50 to slidably or pivotally move with respect to top portion 25, for example. Preferably, cover 50 is hingedly and/or pivotally attached to wall 35 along a perforated line so that cover 50 is movable with respect to top portion 25 between a closed position, covering compartments 40 and/or planar surface 30, and an open position. Cover 50 provides for the retention of heat and prevents foreign objects, such as dust and/or dirt, from undesirably contacting the contents contained within wall 35. For example, apparatus 20 as shown in FIGS. 8-10 is particularly suitable for transporting heated food products, such as pizza, or other food products, such as bakery goods, that should be covered from the surrounding environment as the products are being transported, delivered or moved. Thus, apparatus 20 may include an integrated "box" within which an object or product, such as a hot pizza, may be placed. Alternatively, apparatus 20 may be fixed to a box prior to use or pre-integrated with the box as a feature of the box.

Apparatus 20 also includes a base 60. Preferably, top portion 25 transitions into or is connected or attached to base 60. Base 60 is foldable or bendable with respect to top portion 25 and at least a free end portion 61 of base 60 is removably securable to top portion 25 at any desired position of a plurality of positions along bottom surface 27. The securement position of base 60 with respect to top portion 25 is adjustable to adjust a height of base 60 to a suitable or desirable lift position to correspond with an inclination angle of the support surface 100, as shown in FIGS. 4-7. Base 60 is movable between a flat position, generally parallel with bottom surface 27 and contacting at least a portion of bottom surface 27 of top portion 25, and a folded position, wherein base 60 is folded with respect to top portion 25 and removably secured to top portion 25 at a desired or selected position.

In one preferred embodiment of this invention, at least one tab 62 is connected to or formed at free end portion 61 of base 60. Tab 62 is preferably connectable to top portion 25 using a suitable adhesive connector and/or a mechanical connector. As shown in FIG. 10, tab 62 is connectable with respect to top portion 25 to removably secure base 60 at a suitable or desirable lift position corresponding to an inclination angle α of the support surface 100 to maintain the object or product supported on top portion 25 level with respect to the support surface 100.

Figure 2:
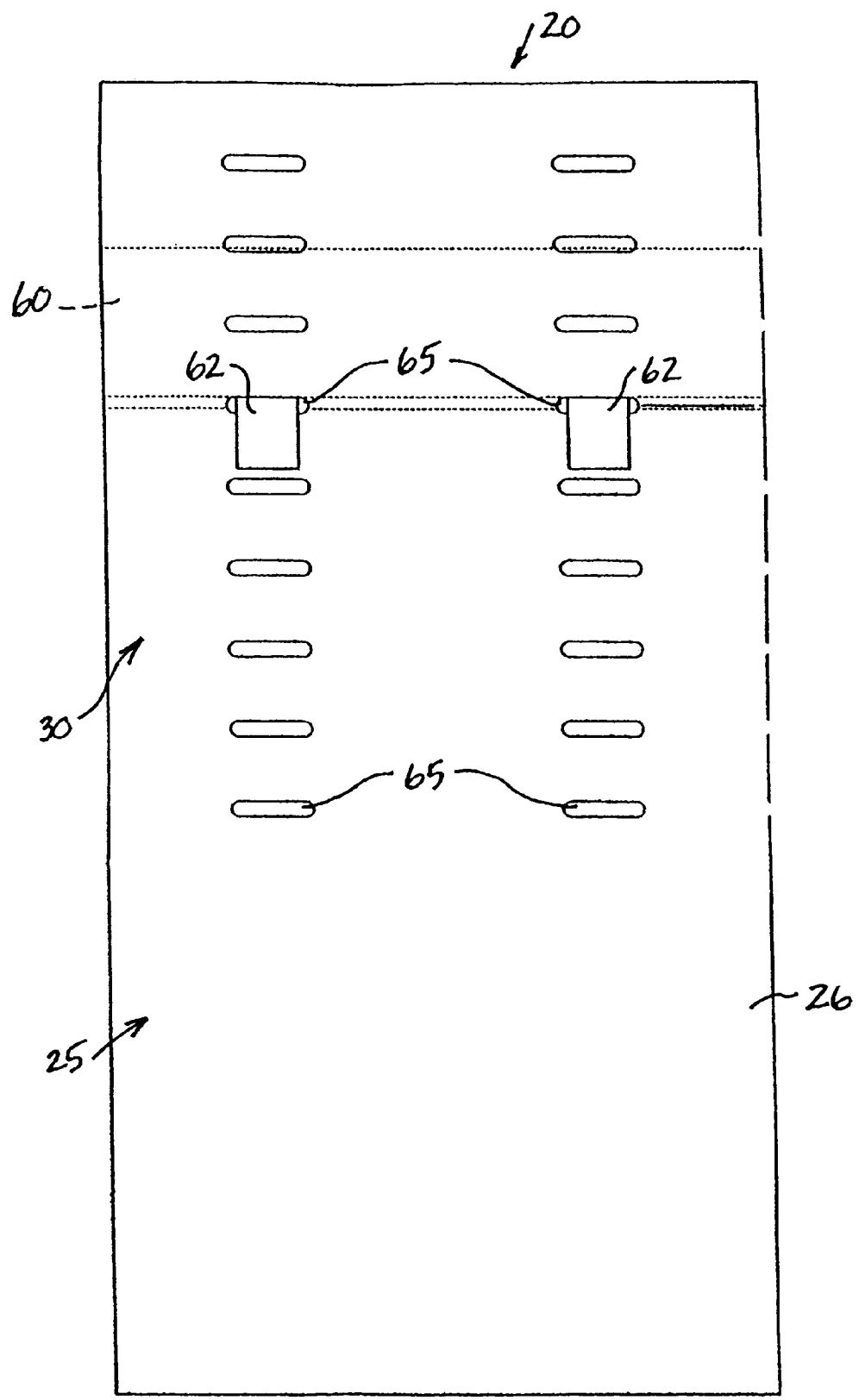
FIG. 2 is a top view of an apparatus or device for maintaining an object in a level position, according to one preferred embodiment of this invention.
Figure 3:
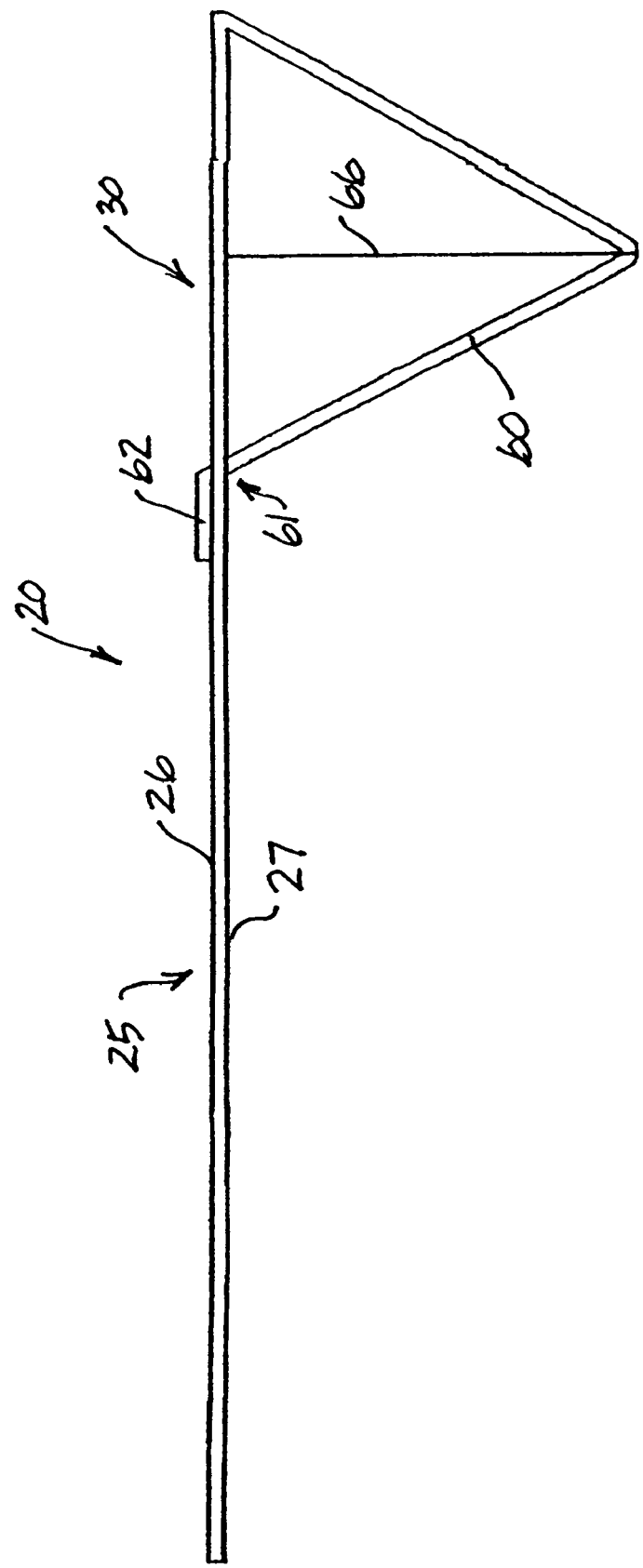
FIG. 3 is a side view of the apparatus shown in FIG. 2.
Figure 4:
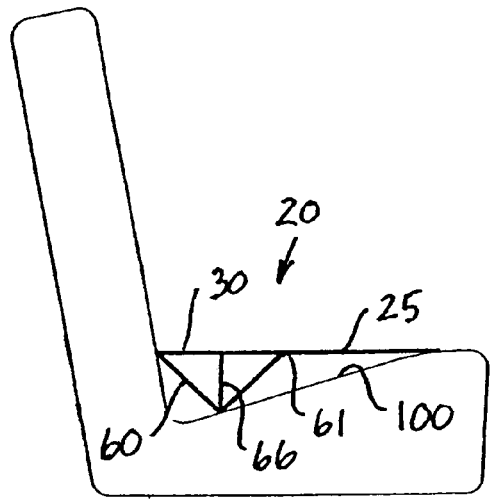
FIGS. 4-7 is a side view of the apparatus shown in FIG. 2 in various lift positions and positioned on a vehicle seat.
Figure 5:
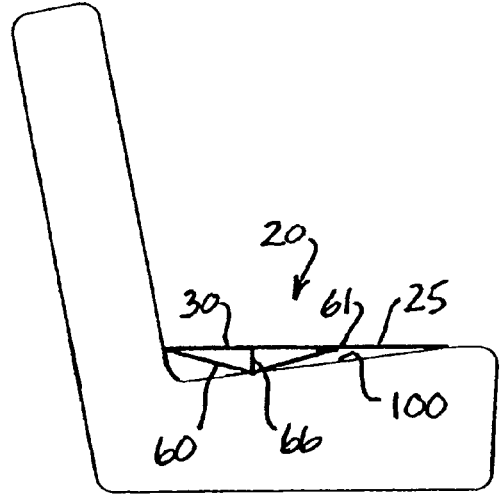
Figure 6:
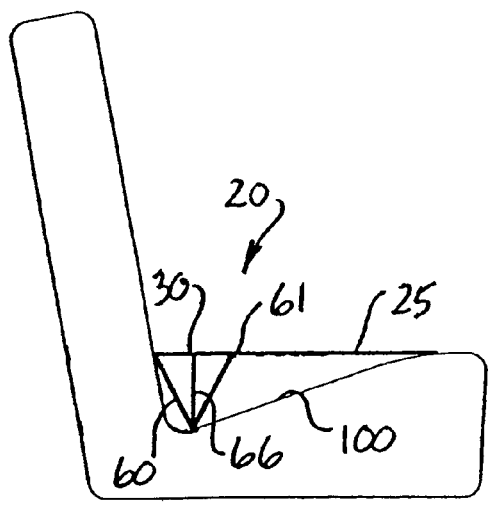
Figure 7:
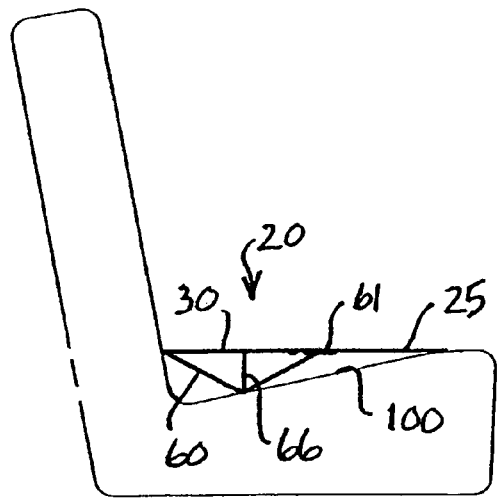

As shown in FIGS. 2 and 3, top portion 25 preferably includes or forms a plurality of sets or pairs of parallel slots 65. Preferably, each set or pair of parallel slots 65 is evenly spaced along a length of top portion 25. For example, each set of parallel slots 65 may be positioned at a distance of about 1 inch from adjacent sets of parallel slots 65. Other suitable distances less than and/or greater than 1 inch may be used, if desired. Parallel tabs 62 formed at free end portion 61 of base 60 interfere with and/or are positionable within a corresponding set of parallel slots 65, as shown in FIG. 2, to secure base 60 at a height corresponding to the inclination angle α of the support surface 100. For example, each tab 62 can be positioned within a corresponding slot 65 and provide suitable support for maintaining base 60 at a desired height. Typical vehicle seats are positioned at an inclination angle, such as shown in FIGS. 4-7. The inclination angle results in shifting and/or movement of an object or food product, such as pizza, within its container and/or with respect to the inclined or angled vehicle seat when placed on the vehicle seat by drivers. Apparatus 20 maintains a level planar surface 30 for placement of the pizza and/or the pizza container or box, for example.

In one preferred embodiment of this invention, as shown in FIGS. 3-7 and 10, base 60 has a general triangular cross-section. A height of an apex 66 defined by base 60 is preferably adjustable from about 0 inches, wherein base 60 is generally flat with respect to top portion 25, to about 6 inches, and more preferably between about 1 inch and 5 inches. The height of base 60 is adjustable by positioning tabs 62 within selected corresponding slots 65, as desired. Base 60 can have any suitable cross-section including, without limitation, a rectangular or other suitable polygonal cross-section.

Thus, the invention provides a base that is attached or connected to a top portion of the apparatus and is foldable or bendable with respect to the top portion. The base is removably securable to the top portion at one of a plurality of positions to adjust a height of the base. The base is movable between a flat position contacting at least a portion of the bottom surface of the top portion and a folded position, wherein the base is folded with respect to the top portion and adjustably securable to the top portion.

It is apparent from the teachings herein provided that the apparatus or device of the present invention has numerous suitable applications in various industries including, without limitation, the food delivery industry, the bakery industry, the beverage industry, the medical industry and the petroleum industry. The apparatus or device of the present invention is suitable for transporting, delivering and/or moving a variety of objects and/or products including, without limitation, food products, such as pizza, sandwiches, cakes, pies, coffee and soft drinks, and/or any solid, liquid and/or gas product. Further, the apparatus or device of the present invention can be used on any support surface including, without limitation, any inclined or angled vehicle seat.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for leveling an object with respect to a support surface, the apparatus comprising:
   a top portion defining a planar surface, the top portion transitioning into a base, the base foldable with respect to the top portion, and a free end portion of the base removably securable to the top portion at one position of a plurality of positions to adjust a height of the base, wherein the base has a general triangular cross-section, and a height of an apex defined by the base is generally perpendicular and adjustable with respect to the top portion.

2. The apparatus of claim 1 wherein the base is movable between a flat position contacting a bottom surface of the top portion and a folded position wherein the base is folded with respect to the top portion and removably secured to the top portion at one position.

3. The apparatus of claim 1 further comprising:
   at least one tab formed at the free end portion of the base, the tab connectable with respect to the top portion to removably secure the base at a height corresponding to an inclination angle of the support surface.

4. The apparatus of claim 3 wherein the tab is at least one of adhesively connectable and mechanically connectable to the top portion.

5. The apparatus of claim 1 further comprising:
   a plurality of sets of parallel slots formed in the top portion; and
   parallel tabs formed at the free end portion of the base, the parallel tabs interfering with one set of parallel slots to secure the base at a height corresponding to an inclination angle of the support surface.

6. The apparatus of claim 5 wherein the sets of parallel slots are evenly spaced along a length of the top portion.

7. The apparatus of claim 1 wherein the base has a general triangular cross-section, and a height of an apex defined by the base is adjustable from about 1 inch to about 6 inches.

8. The apparatus of claim 1 wherein the top portion further comprises a wall extending about at least a portion of a periphery of the planar surface.

9. The apparatus of claim 8 wherein the planar surface has a plurality of compartments formed by at least one support wall extending between a first wall portion of the wall and an opposing second wall portion of the wall.

10. The apparatus of claim 1 wherein the top portion forms at least one void for accepting a container.

11. The apparatus of claim 1 wherein a portion of the top portion forms a recessed storage void.

12. The apparatus of claim 1 wherein the apparatus is made of at least one of a plastic, a cloth, a paper, a cardboard, and a corrugated cardboard material.

13. An apparatus for leveling an object with respect to a support surface, the apparatus comprising:
    a top portion defining a planar surface and having a wall extending about at least a portion of a periphery of the planar surface; and
    a base connected to the top portion, the base foldable with respect to the top portion, and a free end portion of the base removably securable to the top portion at one position of a plurality of positions to adjust a height of the base, wherein the base has a general triangular cross-section, and a height of an apex defined by the base is generally perpendicular and adjustable with respect to the top portion.

14. The apparatus of claim 13 wherein the planar surface has a plurality of compartments formed by at least one support wall extending between a first wall portion of the wall and a second wall portion of the wall.

15. The apparatus of claim 14 wherein at least one recessed storage void is formed within at least one compartment of the compartments.

16. The apparatus of claim 13 wherein the top portion forms at least one void for accepting a container.

17. The apparatus of claim 13 further comprising:
    a plurality of sets of parallel slots formed in the base; and
    parallel tabs formed at the free end portion of the base, the parallel tabs interfering with one set of parallel slots to secure the base at a height corresponding to an inclination angle of the support surface.

18. The apparatus of claim 13 wherein the base has a general triangular cross-section, and a height of an apex defined by the base is about 1 inch to about 6 inches.

19. An apparatus for leveling an object with respect to a support surface, the apparatus comprising:
    a top portion defining a planar surface and having a wall extending about a periphery of the planar surface;
    a cover hingedly attached to a portion of the wall, the cover movable between a closed position covering the planar surface and an open position; and
    a base connected to the top portion, the base movable between a flat position contacting a bottom surface of the top portion and a folded position, the base folded with respect to the top portion and a free end portion of the base adjustably securable to the top portion, the base having a general triangular cross-section, wherein a height of an apex defined by the base is generally perpendicular and adjustable with respect to the top portion.

20. The apparatus of claim 19 wherein the planar surface has a plurality of compartments formed by at least one support wall extending between a first wall portion of the wall and an opposing second wall portion of the wall.

* * * * *